United States Patent
Fukuda (10) Patent No.: US 7,983,328 B2
(45) Date of Patent: Jul. 19, 2011

(54) DATA TRANSMISSION DEVICE

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 12/049,006

(22) Filed: Mar. 14, 2008

(65) Prior Publication Data

US 2008/0225932 A1  Sep. 18, 2008

(30) Foreign Application Priority Data

Mar. 15, 2007  (JP) .................................. 2007-066184

(51) Int. Cl.
*H04B 1/38*  (2006.01)

(52) U.S. Cl. ......................................................... 375/219

(58) Field of Classification Search .................. 375/219, 375/221, 271, 295, 302; 332/100, 103
See application file for complete search history.

(56) References Cited

U.S. PATENT DOCUMENTS

| | | | |
|---|---|---|---|
| 2006/0045219 A1* | 3/2006 | Wang et al. | 375/346 |
| 2006/0211386 A1* | 9/2006 | Thomas et al. | 455/104 |

FOREIGN PATENT DOCUMENTS

| | | |
|---|---|---|
| JP | 10209914 | 8/1998 |
| JP | 2005-072790 | 3/2005 |
| JP | 200564822 | 3/2005 |
| JP | 2006-005651 | 1/2006 |
| JP | 2006-323223 | 3/2011 |

OTHER PUBLICATIONS

Japanese Office Action for corresponding JP2007-066184 issued on Apr. 5, 2011.

* cited by examiner

*Primary Examiner* — Don N Vo (74) *Attorney, Agent, or Firm* — K&L Gates LLP (57) ABSTRACT

A data transmission device for sending back data on a reflected wave of an unmodulated carrier, the data transmission device includes: an antenna adapted to receive an unmodulated carrier Fo from a data reader with which data is to be exchanged and send a reflected wave of the unmodulated carrier Fo to the data reader; subcarrier oscillation means for generating a subcarrier frequency Fs; subcarrier modulation means for digitally modulating sending data on the subcarrier Fs; D/A conversion means for generating the analog modulated subcarrier wave Fs by converting a digital modulated signal, generated by the subcarrier modulation means, into analog form; and frequency mixing means for mixing the unmodulated carrier Fo and modulated subcarrier wave Fs to generate new modulated waves Fo+Fs and Fo−Fs.

9 Claims, 6 Drawing Sheets

PRIOR ART

DATA TRANSMISSION DEVICE

CROSS REFERENCES TO RELATED APPLICATIONS

The present application claims priority related to Japanese Patent Application JP 2007-066184 filed with the Japan Patent Office on Mar. 15, 2007, the entire contents of which is being incorporated herein by reference.

BACKGROUND

The present application relates to a data transmission device of a reflected wave transmission system for transmitting data using a modulated reflected wave generated by modulating an unmodulated carrier supplied from a data reader. The present application relates more particularly to a data transmission device for handling high speed data transmission by performing a primary modulation of a subcarrier followed by a secondary modulation of a reflected wave.

More specifically, the present application relates to a data transmission device for providing faster reflected wave data transmission by using a primary modulation which can carry binary or multi-level amplitude information. The present application relates more particularly to a data transmission device for suppressing a modulated reflected wave from spreading into side lobes during a primary modulation of a subcarrier.

A non-contact communication system called RFID (Radio Frequency Identification) is known as a communication system adapted to wirelessly send data without having any own radio wave generating source. The RFID includes a tag and reader. The tag is a passive device, receiving radio wave from the reader as an energy source so that information is read from the tag.

Although referred to in various manners such as ID System and Data Carrier System, the RFID System or RFID for short, is a globally common name. The RFID can be translated to mean Identification System Using High Frequency (Radio Frequency) in Japanese.

Non-contact communication techniques used for the RFID system are capacitive coupling, electromagnetic induction and radio communication. Of these techniques, the RFID system based on radio communication includes a reflector and reflected wave reader. The reflector sends data on a reflected wave generated by modulating a received unmodulated carrier. The reflected wave reader reads data from the modulated reflected wave from the reflector. This system performs reflected wave transmission called "backscatter."

Upon receipt of an unmodulated carrier from the reflected wave reader, the reflector modulates data on the reflected wave of the carrier, for example, by changing the antenna load impedance. That is, the reflector demands no carrier generating source. This makes it possible for the reflector to ensure low power consumption in data transmission. Upon receipt of such a modulated reflected wave, the reflected wave reader demodulates and decodes the received reflected wave to obtain transmitted data.

On the other hand, an antenna switch adapted to change the antenna load impedance of the reflector may be incorporated in a circuit module and configured with CMOS (Complementary Metal Oxide Semiconductor) transistors. However, the switch provides low power consumption and fast switching if it is separate from the circuit module and configured with gallium arsenide (GaAs) IC (Integrated Circuit). The latter offers improved data transmission rate using reflected wave modulation and keeps the power consumption to several tens of $\mu W$ or less. Considering that wireless LAN consumes several hundreds of mW to several W during communication, reflected wave communication can be said to be by far superior in performance to typical wireless LAN in terms of average power consumption (refer, for example, to Japanese Patent Laid-Open No. Hei 10-209914, hereinafter referred to as Patent Document 2).

A reflector-equipped terminal does nothing but reflect the received radio wave. As a result, the terminal is not regarded as a radio station. Instead, it is treated as a device not subject to laws or regulations relating to radio wave communication. Further, other types of non-contact communication systems such as those based on electromagnetic induction employ frequencies between several MHz to several hundreds of MHz (e.g., 13.65 MHz). In contrast, systems based on reflected wave communication can provide high speed data transmission using, for example, the high frequency 2.4 GHz (microwave) band, which is referred to as the ISM (Industry, Science, and Medical Band).

For example, a reflector is built into a terminal device whose power consumption should be kept to a minimum such as digital camera, video camcorder, mobile phone, mobile information terminal, or portable music player. A reflected wave reader is built into host equipment which includes a stationary household electric appliance such as television set, monitor, printer, PC, VCR, or DVD player. This makes it possible to upload image data captured with a camera-equipped mobile phone or digital camera to the PC via a reflected wave transmission line so that such image data can be accumulated, displayed or printed.

In reflected wave transmission, the frequency of the carrier from the reader is normally the same as the center frequency of the reflected wave. This forces the reader to handle sending and reception at the same frequency. As a result, the receiving section is prone to DC offset and sender noise due to coupling loop interference caused by a sending signal. This makes it difficult to expand the transmission distance. Therefore, the isolation between the sender and receiver is a problem to be addressed. On the other hand, the reflected wave transmission employs ASK (Amplitude Shift Keying) or PSK (Phase Shift Keying) for modulation in almost all cases, making it difficult to provide faster transmission. A solution proposed to solve these problems is to modulate data on a subcarrier, for example, by PSK, QPSK or 8PSK as a primary modulation, followed by modulation of the reflected wave by changing the antenna load impedance using an antenna switch (refer, for example, to Patent Document 2).

In the above reflected wave transmission adapted to perform a primary modulation of a subcarrier, however, the antenna switch is turned on and off using a binary digital signal carried by the subcarrier. As a result, only relatively slow subcarrier modulation schemes, such as ASK, PSK, QPSK (Quadrature PSK) and 8PSK, which demand only binary amplitude information, can be used. In other words, modulation schemes carrying binary or multi-level amplitude information such as 16QAM (Quadrature Amplitude Modulation), 64QAM and OFDM (Orthogonal Frequency Division Multiplexing) cannot be used.

Further, even when a modulation scheme such as ASK, PSK, QPSK or 8PSK is used, it is impossible to modulate the reflected wave using the antenna switch if the digital modulated signal is limited in bandwidth and converted into analog form. In this case, the frequency spectrum of the reflected wave spreads out infinitely, raising concern that other systems in the neighborhood may be affected by interference. These problems will be described below.

Figure 6:
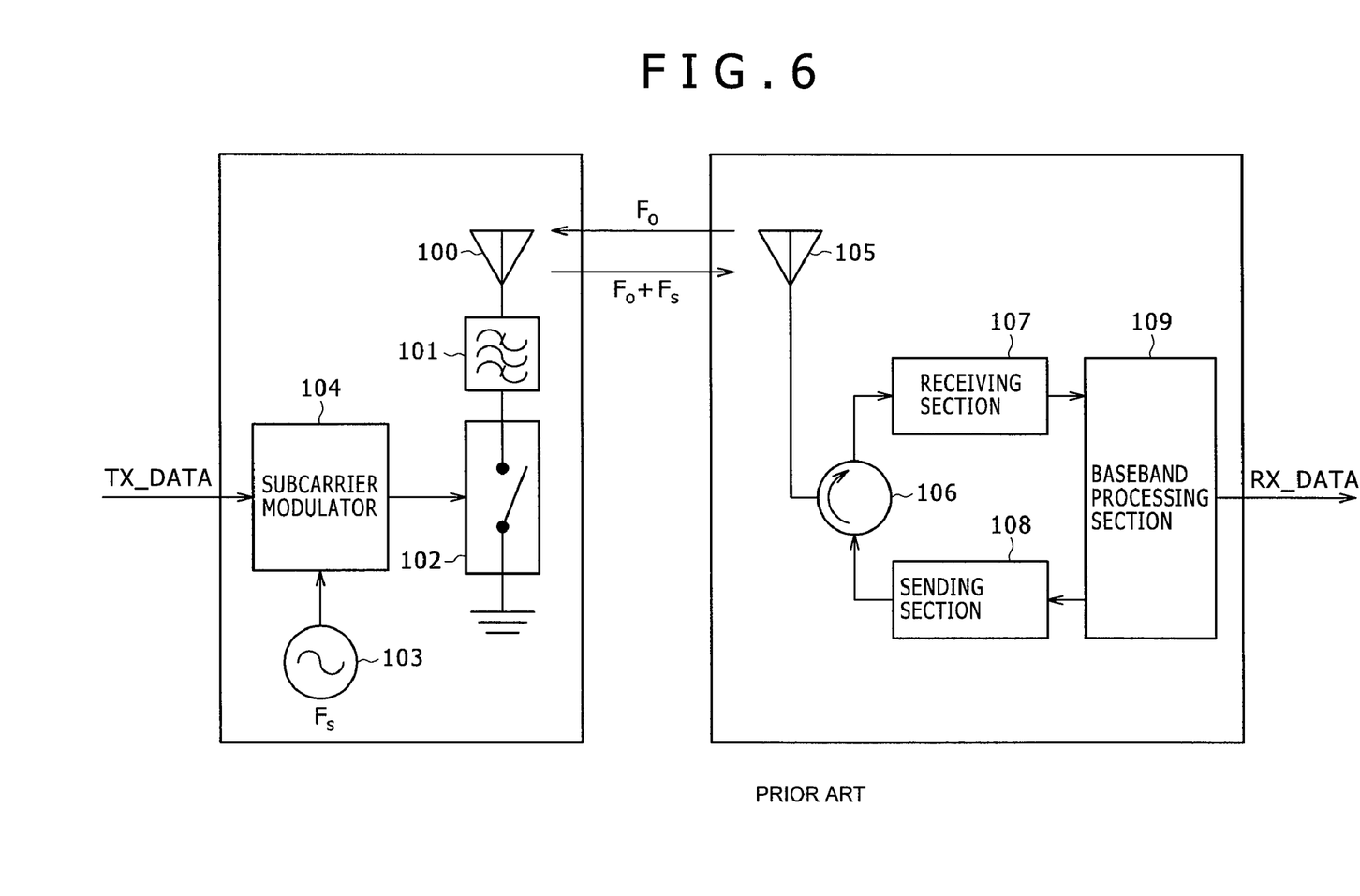
FIG. 6 is a view illustrating a configuration example of a reflected wave transmission system using a subcarrier.

FIG. 6 illustrates a configuration example of a reflected wave transmission system using a subcarrier. In FIG. 6, reference numeral 10 denotes a data transmission device adapted to send data by modulating the reflected wave of a received radio wave. Reference numeral 11 denotes a data reader adapted to receive the modulated reflected wave signal from the transmission device 10 to read data therefrom.

The data transmission device 10 is incorporated in a mobile device which serves primarily as a data transmission source such as digital camera or mobile phone. The same device 10 transmits moving image data and music data stored therein to the reader 11. As illustrated in FIG. 6, the transmission device 10 includes an antenna 100, a band-pass filter (BPF) 101, an antenna load selector switch 102, a subcarrier oscillator 103 having a frequency Fs and a subcarrier modulator 104.

One end of the antenna load selector switch 102 is grounded. The same switch 102 serves as a load of the antenna 102 and is short-circuited when turned on and open-circuited when turned off, thus allowing an unmodulated wave from external equipment to be PSK-modulated. The subcarrier modulator 104 controls the on/off state of the antenna load selector switch 102 using a digital modulated signal generated from sending data (TX_DATA). The subcarrier oscillator 103 generates a center frequency Fs used to modulate the subcarrier. Thus, the subcarrier modulator 104 can generate two modulated waves of an unmodulated carrier having a center frequency Fo received by the antenna 100. The two modulated waves respectively have center frequencies Fo+Fs and Fo−Fs which are upwardly and downwardly apart by the subcarrier frequency Fs from the unmodulated carrier at the center frequency Fo.

On the other hand, the band-pass filter 101 in the transmission device 10 is used to extract only one of the two modulated waves (Fo+Fs in the example shown). Thus, the same filter 101 passes the received radio wave at the center frequency Fo and the modulated reflected wave at the center frequency Fo+Fs. Here, the band-pass filter 101 need not be used. In this case, however, the frequency spectrum of the modulated reflected wave spreads out infinitely. Even when the band-pass filter 101 is used, it is unrealistic to hope for a frequency characteristic steep enough to attenuate the side lobes. As a result, the spread of the spectrum must be tolerated to a certain extent. Here, the center frequency Fo of the unmodulated carrier is assumed to be in 2.4 GHz band, and the subcarrier frequency Fs to be several tens of MHz.

On the other hand, the reader 11 includes an antenna 105, a sending section 108 adapted to send the unmodulated carrier Fo, and a receiving section 107 adapted to receive the modulated reflected wave Fo+Fs of the unmodulated carrier Fo from the transmission device 10. The reader 11 further includes a circulator 106 adapted to separate the sending and receiving sections 108 and 107 so as to simultaneously handle sending and reception with a single antenna 105. The reader 11 still further includes a baseband processing section 109 adapted to handle demodulation and communication control. The unmodulated carrier at the center frequency Fo is transmitted from the sending section 108 via the circulator 106 and antenna 105. This unmodulated carrier returns to the reader 11 in the form of a modulated wave at the center frequency Fo+Fs after being reflected by the transmission device 10. The carrier is received by the receiving section 107 via the antenna 105 and circulator 106. The carrier is then demodulated by the baseband processing section 109 for use as received data (RX_DATA).

Although mention was made of a unidirectional transmission from the transmission device 10 to the reader 11, it is practically common that control and user data is transmitted from the reader 11 to the transmission device 10. However, the latter data transmission is not directly related to the spirit of the present invention. Therefore, a detailed description thereof will be omitted in the present specification.

Figure 7:
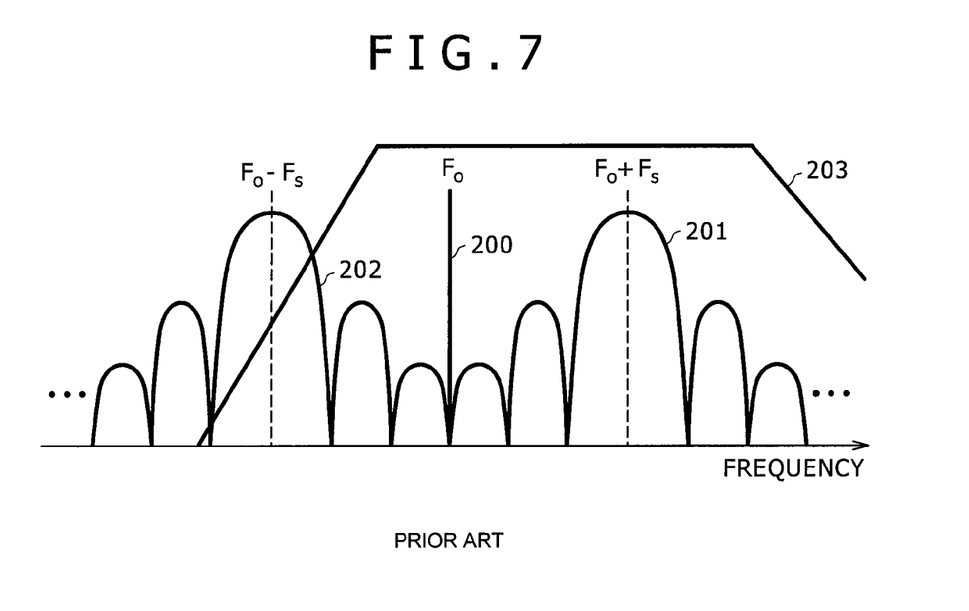
FIG. 7 is a view illustrating the frequency spectrum of the reflected wave transmission system shown in FIG. 6.

FIG. 7 illustrates the frequency spectrum of the reflected wave transmission system shown in FIG. 6. In FIG. 7, reference numeral 200 denotes an unmodulated carrier supplied from the reader 11. Reference numerals 201 and 202 denote modulated reflected waves of the unmodulated carrier generated by the data transmission device 10.

The system shown in FIG. 6 uses only one of the two modulated waves, namely, the wave with the center frequency Fo+Fs. Therefore, the band-pass filter 101 of the data transmission device 10 offers an attenuation characteristic as denoted by reference numeral 203 to attenuate the reflected wave signal. Thus, the same filter 101 passes the unmodulated carrier 200 with the center frequency Fo and the reflected wave 201 with the center frequency Fo+Fs. However, it is difficult to implement the band-pass filter capable of steeply attenuating the side lobes other than the main lobe of the reflected wave 201. As a result, the side lobes spread out to a certain extent as illustrated in FIG. 7.

[Patent Document 1]
Japanese Patent Laid-Open No. 2005-64822

SUMMARY

It is desirable to provide an excellent data transmission device capable of high speed reflected wave data transmission at low power consumption by performing a primary modulation adapted to modulate sending data on a subcarrier followed by a secondary modulation adapted to modulate the reflected wave of an unmodulated carrier from a data reader.

It is desirable to provide an excellent data transmission device capable of faster reflected wave data transmission by a primary modulation which carries binary or multi-level amplitude information.

It is desirable to provide an excellent data transmission device capable of suppressing a modulated reflected wave from spreading into side lobes during a primary modulation of a subcarrier.

A data transmission device according to the an embodiment for sending back data on a reflected wave of an unmodulated carrier includes an antenna. The antenna receives the unmodulated carrier Fo from a data reader with which data is to be exchanged and sends a reflected wave of the unmodulated carrier Fo to the data reader.

The data transmission device further includes subcarrier oscillation means adapted to generate the subcarrier frequency Fs.

The data transmission device still further includes subcarrier modulation means adapted to digitally modulate sending data on the subcarrier Fs.

The data transmission device still further includes D/A conversion means adapted to generate the analog modulated subcarrier wave Fs by converting a digital modulated signal, generated by the subcarrier modulation means, into analog form.

The data transmission device still further includes frequency mixing means adapted to mix the unmodulated carrier Fo and modulated subcarrier wave Fs to generate the new modulated waves Fo+Fs and Fo−Fs.

The RFID system is known as a communication system adapted to wirelessly send data without having any own radio wave generating source. A reflected wave transmission system, which is a type of the RFID system, includes a data transmission device and data reader. The data transmission device has a reflector adapted to receive an unmodulated carrier, superimpose data on the reflected wave of the carrier and send the modulated reflected wave. The data reader has a reflected wave reader adapted to send an unmodulated carrier and read data from the modulated reflected wave. The reflector demands no carrier generating source. This ensures significantly reduced power consumption in data transmission, thus providing an overwhelming superiority in performance over typical wireless LANs.

There are several problems to be addressed in modulating a reflected wave by changing the antenna load impedance of the reflector. Among such problems are isolation between the sender and receiver in the data reader and difficulties in providing faster data transmission due to the fact that only slow modulation schemes such as ASK and PSK can be used. A solution known to these problems is for the data transmission device to modulate sending data on a subcarrier as a primary modulation, and then modulate the reflected wave of an unmodulated carrier as a secondary modulation.

In such a reflected wave transmission using primary digital modulation, however, the antenna load selector switch is turned on and off using a binary digital signal carried by the subcarrier. As a result, only relatively slow subcarrier modulation schemes such as ASK, PSK, QPSK and 8PSK, which demand only binary amplitude information, can be used.

In contrast, the data transmission device according an embodiment does not rely on on/off operation of the antenna switch, namely, the backscatter scheme, although modulating sending data on a subcarrier as a primary modulation. Instead, this device relies on frequency mixing to mix an unmodulated carrier and modulated subcarrier wave, thus modulating the reflected wave and transmitting the modulated reflected wave back to the data reader.

That is, the data transmission device according to an embodiment mixes the unmodulated carrier Fo from the data reader and the analog modulated subcarrier wave Fs for upconversion, thus generating the two new modulated waves Fo+Fs and Fo−Fs. As described above, the data transmission device can use such an analog modulated subcarrier wave. For primary modulation, therefore, high speed modulation schemes can be used including 16QAM, 64QAM and OFDM which carry binary or multi-level amplitude information.

As a result, mobile devices such as digital camera and mobile phone, demanded to be low in power consumption, offer high speed transmission of moving and music data stored therein when equipped with the data transmission device according to the present invention.

Further, the subcarrier modulation means of the data transmission device according to an embodiment have a digital filter. This allows for easy limitation of the bandwidth for subcarrier modulation. As a result, the modulated waves Fo+Fs and Fo−Fs generated by the modulation are also subjected to bandwidth limitation, thus reducing potential interference with other systems.

Here, the frequency mixing means can be configured in the form of an analog mixer using a diode whose operating point is set in the non-saturated region. More specifically, the analog mixer has two input ports, one for the analog modulated signal from the D/A conversion means, and another for the antenna-received signal received via a band-pass filter. A band-pass filter is provided between the antenna and frequency mixing means to pass Fo and one of the Fo+Fs and Fo−Fs.

Alternatively, the frequency mixing means may include a splitter, an FET mixer and a band-pass filter. The splitter divides the antenna-received signal. The FET mixer mixes the analog modulated wave Fs and antenna-received signal Fo divided by the splitter to generate modulated reflected waves, namely, new modulated waves Fo+Fs and Fo−Fs. The band-pass filter has the property to pass only one of the modulated reflected waves Fo+Fs and Fo−Fs. The splitter sends one of the modulated reflected waves Fo+Fs and Fo−Fs from the antenna. Here, the splitter may include a 3-decibel coupler or Wilkinson divider.

Comparison of the two reflected wave modulation schemes, namely, the scheme based on the above frequency mixing and that based on the existing backscatter, in terms of power consumption, reveals that the former cannot provide ultra-low power consumption in data transmission as the latter can.

Therefore, the data transmission device according to an embodiment may be configured to switch its reflected wave modulation scheme over to the backscatter or frequency mixing scheme.

Backscatter modulation means include, for example, an antenna load selector switch and band-pass filter. The antenna load selector switch changes the antenna load impedance. The band-pass filter is disposed between the antenna and antenna load selector switch and has the property to pass the frequency Fo and one of the modulated reflected waves at the frequencies Fo+Fs and Fo−Fs. The backscatter modulation means rely on the change of antenna load impedance caused by the on/off operation of the antenna load selector switch to modulate the reflected wave of the antenna-received radio wave. The on/off operation of the switch is made according to the digital modulated signal generated by the subcarrier modulation means.

Further, an antenna switch is provided to connect the frequency mixing means or backscatter modulation means to the antenna according to the modulation scheme used by the subcarrier modulation means.

The subcarrier modulation means can use, according to the communication quality, either a modulation scheme such as PSK, QPSK or 8PSK which demands only binary amplitude information, or a modulation scheme such as 16QAM, 64QAM or OFDM which carries binary or multi-level amplitude information. The antenna switch connects the backscatter modulation means to the antenna when a modulation scheme, which demands only binary amplitude information, is used by the subcarrier modulation means. The antenna switch connects the frequency mixing means to the antenna when a modulation scheme carrying binary or multi-level amplitude information, is used by the subcarrier modulation means.

When the subcarrier modulation means use a slow modulation scheme such as ASK, PSK, QPSK or 8PSK which demands only binary amplitude information, the antenna switch is switched to the backscatter modulation means. Modulation of the reflected wave using the backscatter scheme ensures reduced average power consumption.

On the other hand, when the subcarrier modulation means use a fast modulation scheme such as 16QAM, 64QAM or OFDM carrying binary or multi-level amplitude information, the antenna switch is switched to the frequency mixing means. Modulation of the reflected wave using the frequency mixing scheme allows for the aforementioned fast primary modulation.

The present application provides an excellent data transmission device capable of high speed reflected wave data transmission at low power consumption. The transmission device allows for such data transmission by performing a primary modulation adapted to modulate sending data on a subcarrier followed by a secondary modulation adapted to modulate the reflected wave of an unmodulated carrier from a data reader.

Further, the present application provides an excellent data transmission device capable of faster reflected wave data transmission. The transmission device allows for such data transmission by using a primary modulation carrying binary or multi-level amplitude information.

Still further, the present application provides an excellent data transmission device capable of suppressing a modulated reflected wave from spreading into side lobes during a primary modulation of a subcarrier.

Additional features and advantages are described herein, and will be apparent from the following Detailed Description and the figures.

DETAILED DESCRIPTION

The present application will be described below with reference to the accompanying drawings according to an embodiment.

Figure 1:
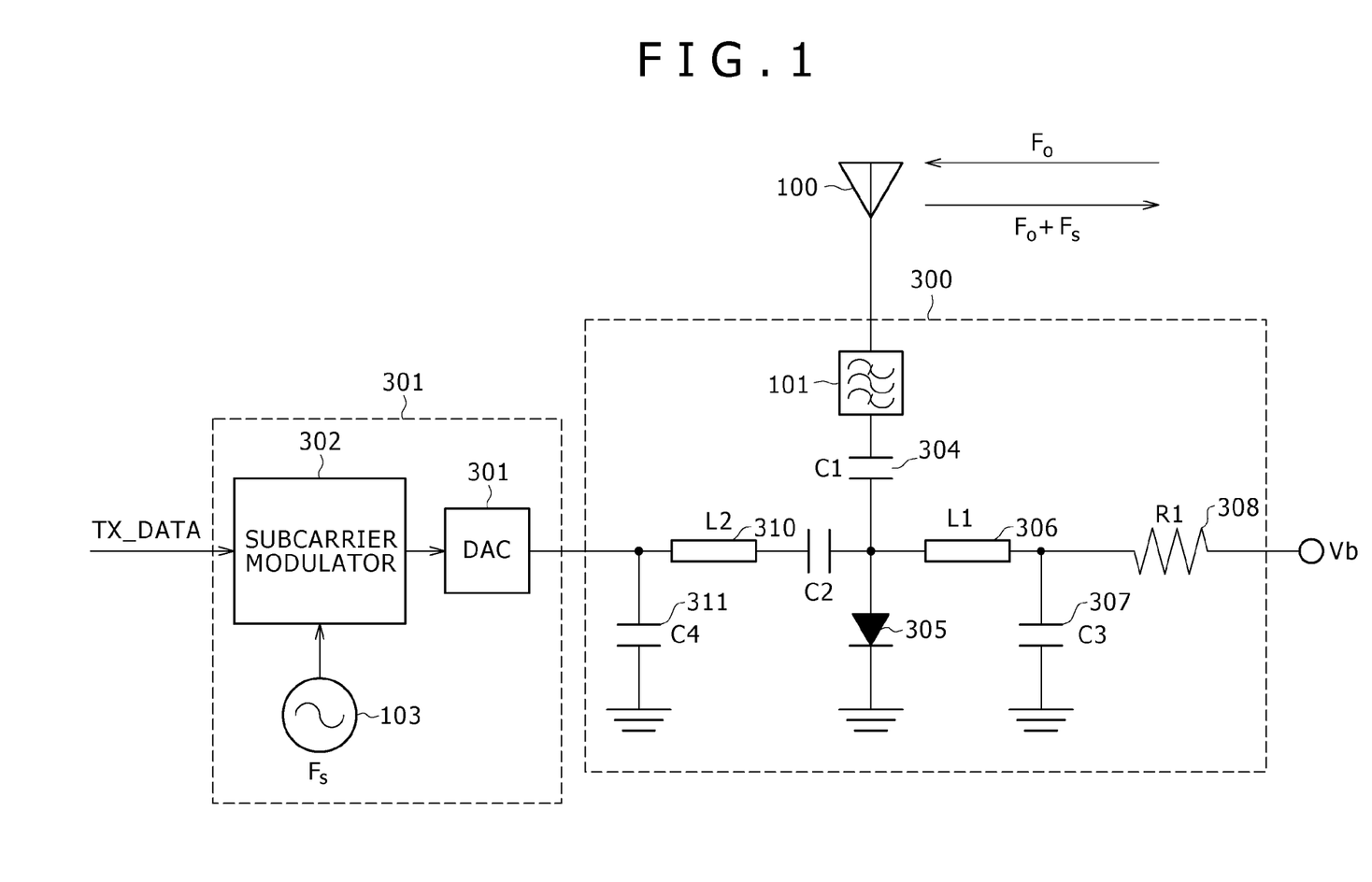
FIG. 1 is a view illustrating the configuration of a data transmission device according to an embodiment.

FIG. 1 illustrates the configuration of a data transmission device according to an embodiment. The data transmission device shown in FIG. 1 has a reflector function adapted to send data through a reflected wave transmission scheme. As a result, the same device is capable of high speed reflected wave data transmission at low power consumption. To do so, the same device performs a primary modulation adapted to modulate sending data on a subcarrier followed by a secondary modulation adapted to modulate the reflected wave of an unmodulated carrier from a data reader. Mobile devices such as digital camera and mobile phone, demanded to be low in power consumption, offer high speed transmission of moving and music data stored therein when equipped with this data transmission device. The configuration and processing operation of the data reader are the same as those of the data reader shown in FIG. 6, and therefore a description thereof is omitted.

The data transmission device 10 shown in FIG. 1 includes, as a primary modulation section 301, a subcarrier modulator 302, subcarrier oscillator 103 at the center frequency Fs and D/A converter 303.

The subcarrier modulator 302 performs a primary modulation adapted to modulate sending data (TX_DATA) on the subcarrier frequency Fs, thus generating a modulated subcarrier wave having a digital value (e.g., 10-bit value) which is limited in bandwidth by a digital filter (not shown). In addition to modulation schemes such as PSK, QPSK and 8PSK, which demand only binary amplitude information, fast modulation schemes such as 16QAM, 64QAM and OFDM carrying binary or multi-level amplitude information can also be used. The D/A converter 303 converts the digital modulated signal into analog form.

Reference numeral 300 denotes an analog mixer adapted to mix the unmodulated carrier, received by the antenna 100, with the analog primary modulated signal. In the example shown in the figure, the analog mixer 300 is a two-port mixer which includes a diode 305. The antenna 100 is connected to the diode 305 via the band-pass filter (BPF) 101. On the other hand, a DC bias voltage Vb is applied to the diode 305 via a resistor R1 (308) and inductor L1 (306), thus setting the operating point of the diode 305 in the non-saturated region.

The analog modulated wave at the center frequency Fs from the D/A converter 303 is sent to the diode 305 via an inductor L2 (310). The analog modulated wave is mixed with the unmodulated carrier Fo from the antenna 100 in the non-linear region of the diode 305, thus producing two modulated waves respectively at the center frequencies Fo+Fs and Fo−Fs. The band-pass filter 101 has the property to pass Fo and Fo+Fs. As a result, the antenna 100 sends back the modulated wave Fo+Fs.

It should be noted that capacitors C1 (304) and C2 (309) are used to cut off DC component resulting from the DC bias voltage Vb contained in the analog modulated wave at the center frequency Fs and the newly generated modulated waves Fo±Fs. A pair of the inductor L1 (306) and a capacitor C3 (307) and another pair of the inductor L2 (310) and a capacitor C4 (311) each function as a low-pass filter (LPF) adapted to pass DC and the subcarrier frequency Fs while presenting a high impedance to the frequency Fo. These components are used to reduce leakage of the unmodulated carrier at the frequency Fo, received by the antenna 100, to components other than the diode 305.

As described above, an analog mixer which includes a two-port diode mixer can generate the modulated wave with the center frequency Fo+Fs and transmit the wave to the data reader.

Figure 2:
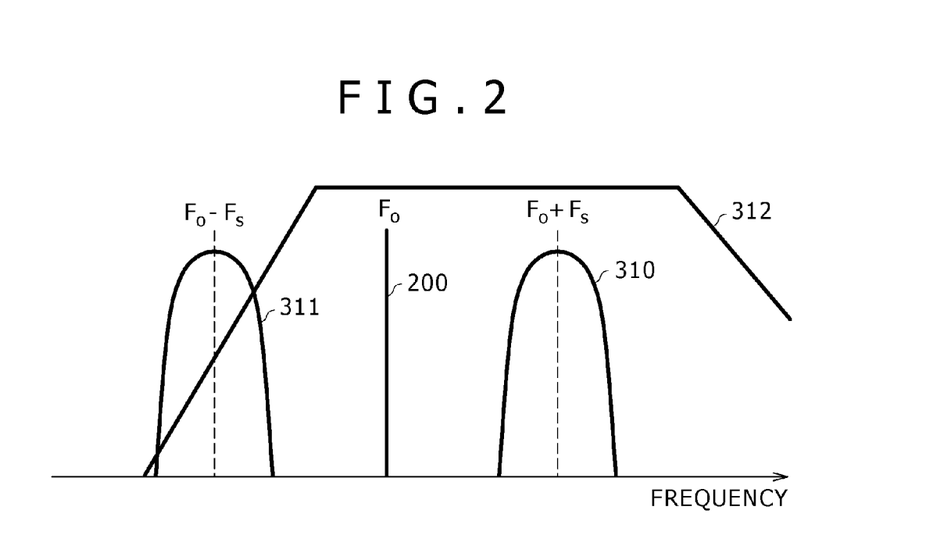
FIG. 2 is a view illustrating the frequency spectrum of a reflected wave transmission system using the data transmission device shown in FIG. 1.

FIG. 2 illustrates the frequency spectrum of a reflected wave transmission system using the data transmission device shown in FIG. 1. In FIG. 2, reference numeral 200 denotes an unmodulated carrier from the data reader. We assume that the data reader is the same as that shown in FIG. 6.

In FIG. 2, reference numerals 310 and 311 denote the two modulated waves Fo+Fs and Fo−Fs generated by the data transmission device 10, respectively. In the example shown in this figure, only the modulated wave at the center frequency Fo+Fs is used. Therefore, the band-pass filter 101 has the attenuation property as denoted by reference numeral 312. As a result, the same filter 101 passes the unmodulated carrier 200 at the center frequency Fo and the modulated wave 310 at the center frequency Fo+Fs.

Further, the modulated wave is limited in bandwidth by a digital filter (not shown) provided in the subcarrier modulator 302. As a result, the modulated wave spectra 310 and 311 do not spread over a wide bandwidth. This makes it possible to transmit only the main lobe as illustrated in FIG. 2.

Figure 3:
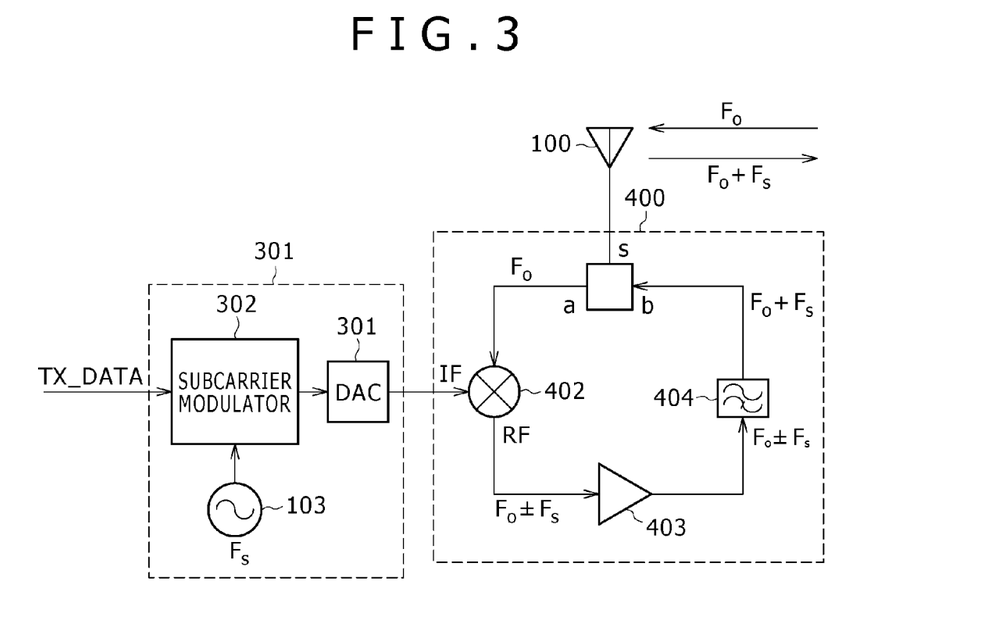
FIG. 3 is a view illustrating the configuration of a data transmission device 10 using an analog mixer which includes an FET or transistor.

In the embodiment shown in FIG. 1, the data transmission device 10 employs a mixer which includes a diode for use as an analog mixer adapted to mix the unmodulated carrier received by the antenna 100 with the analog primary modulated signal. However, the diode mixer is generally known to cause a large loss. Therefore, the inventors propose a configuration of the data transmission device 10 as shown in FIG. 3 as an alternative embodiment. The data transmission device uses an analog mixer which includes an FET or transistor.

In FIG. 3, the data transmission device 10 includes, as the primary modulation section 301, the subcarrier modulator 302, subcarrier oscillator 103 adapted to generate the subcarrier with the center frequency Fs, and D/A converter 303.

The subcarrier modulator 302 performs a primary modulation adapted to modulate sending data (TX_DATA) on the subcarrier frequency Fs, thus generating a modulated subcarrier wave having a digital value (e.g., 10-bit value) which is limited in bandwidth by a digital filter (not shown). In addition to modulation schemes PSK, QPSK and 8PSK, which demands only binary amplitude information, fast modulation schemes such as 16QAM, 64QAM and OFDM carrying binary or multi-level amplitude information can also be used. The D/A converter 303 converts the digital modulated signal into analog form.

Reference numeral 400 denotes a mixing section adapted to mix the unmodulated carrier received by the antenna 100 with the analog primary modulated signal. In the example shown in FIG. 3, the mixing section 400 includes a splitter 401, mixer 402 and low-pass filter 404.

The antenna 100 is connected to a terminal 's' of the splitter (combiner) 401. The signal received by the antenna 100 is divided into two and delivered to terminals 'a' and 'b.' A 3-decibel coupler or Wilkinson divider is used as the splitter 401. The loss caused by the division is 3-decibel.

The mixer 402 includes an FET. The mixer receives, as an input, the output of the terminal 'a' to which one of the signals generated by the splitter 401 is delivered. This input is fed through a local input terminal. The mixer receives, as another input, an analog modulated subcarrier wave from the primary modulation section. This input is fed through an IF input terminal. The mixer mixes the two inputs for upconversion. The mixer outputs the two modulated waves at the center frequencies Fo+Fs and Fo−Fs from its RF output terminal.

The low-pass filter 404 has the property to pass only the wave Fo+Fs of the two. The output of the same filter 404 is connected to the terminal 'b' of the splitter (combiner) 401. The antenna 100 sends back the modulated wave Fo+Fs.

The mixer 402 typically has a conversion gain. However, a total loss of 6-decibel occurs between the terminals 's' and 'a' and between the terminals 'b' and 's.' Therefore, an amplifier 403 may be provided after the mixer 402 in some cases.

As described above, the three-port FET mixer can generate the modulated wave at the center frequency Fo+Fs, which can then be sent back to the data reader.

Figure 4:
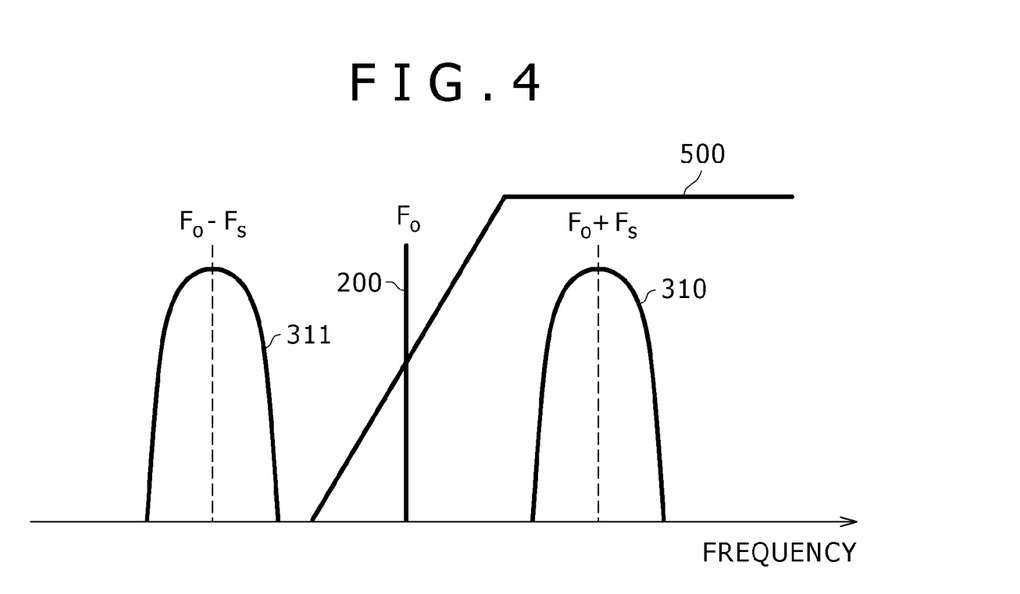
FIG. 4 is a view illustrating the frequency spectrum of a reflected wave transmission system using the data transmission device shown in FIG. 3.

FIG. 4 illustrates the frequency spectrum of a reflected wave transmission system using the data transmission device shown in FIG. 3. In FIG. 3, reference numeral 200 denotes an unmodulated carrier from the data reader. We assume that the data reader is the same as that shown in FIG. 6.

Also, in FIG. 4, reference numerals 310 and 311 denote the two modulated waves Fo+Fs and Fo−Fs generated by the data transmission device 10, respectively. In the example shown in FIG. 4, only the modulated wave at the center frequency Fo+Fs is used. Therefore, the band-pass filter 101 has the attenuation property as denoted by reference numeral 500. As a result, the same filter 101 passes the modulated wave 310 at the center frequency Fo+Fs.

Further, the modulated wave is limited in bandwidth by a digital filter (not shown) provided in the subcarrier modulator 302. As a result, the modulated wave spectra 310 and 311 do not spread over a wide bandwidth. This makes it possible to transmit only the main lobe as illustrated in FIG. 4.

As described above, the data transmission device shown in FIGS. 1 and 3 performs conversion of a digital modulated signal into analog form, followed by mixing of the modulated wave with an unmodulated carrier using an analog mixer, namely, frequency mixing, thus generating modulated reflected waves. In such a case, a primary modulation, which carries binary or multi-level amplitude information, provides faster reflected wave data transmission.

Here, we will compare the two reflected wave modulation schemes, one based on frequency mixing as shown in FIGS. 1 and 3 and the other based on backscatter as shown in FIG. 6, in terms of power consumption.

The latter scheme based on backscatter relies on the change of antenna load impedance caused by the on/off operation of the antenna switch to modulate the reflected wave of the antenna-received radio wave. The on/off operation of the switch is made by a digital modulated signal. If a gallium arsenide FET switch is used as the antenna switch, the current demanded for this modulation is almost 0 mA. This ensures ultra-low power consumption in data transmission.

In contrast, according to the former scheme based on frequency mixing, the current consumption using a diode mixer as shown in FIG. 1 is about 1 mA. The current consumption of an FET mixer shown in FIG. 3 is about 5 mA. Although low, these current consumptions are higher than that using a gallium arsenide FET switch. As a result, ultra-low power consumption cannot be ensured in data transmission.

For this reason, the inventors further propose a data transmission device configured to switch the reflected wave modulation scheme between the backscatter and frequency mixing schemes. In this case, the data transmission device supports a plurality of modulation schemes for primary subcarrier modulation. In addition, the data transmission device adaptively switches the reflected wave modulation scheme to the backscatter or frequency mixing scheme when switching the subcarrier modulation scheme according to the communication quality. For example, when a slow modulation scheme such as ASK, PSK, QPSK or 8PSK is used which demands only binary amplitude information, the average power consumption can be reduced by using the backscatter scheme for modulation of the reflected wave.

Figure 5:
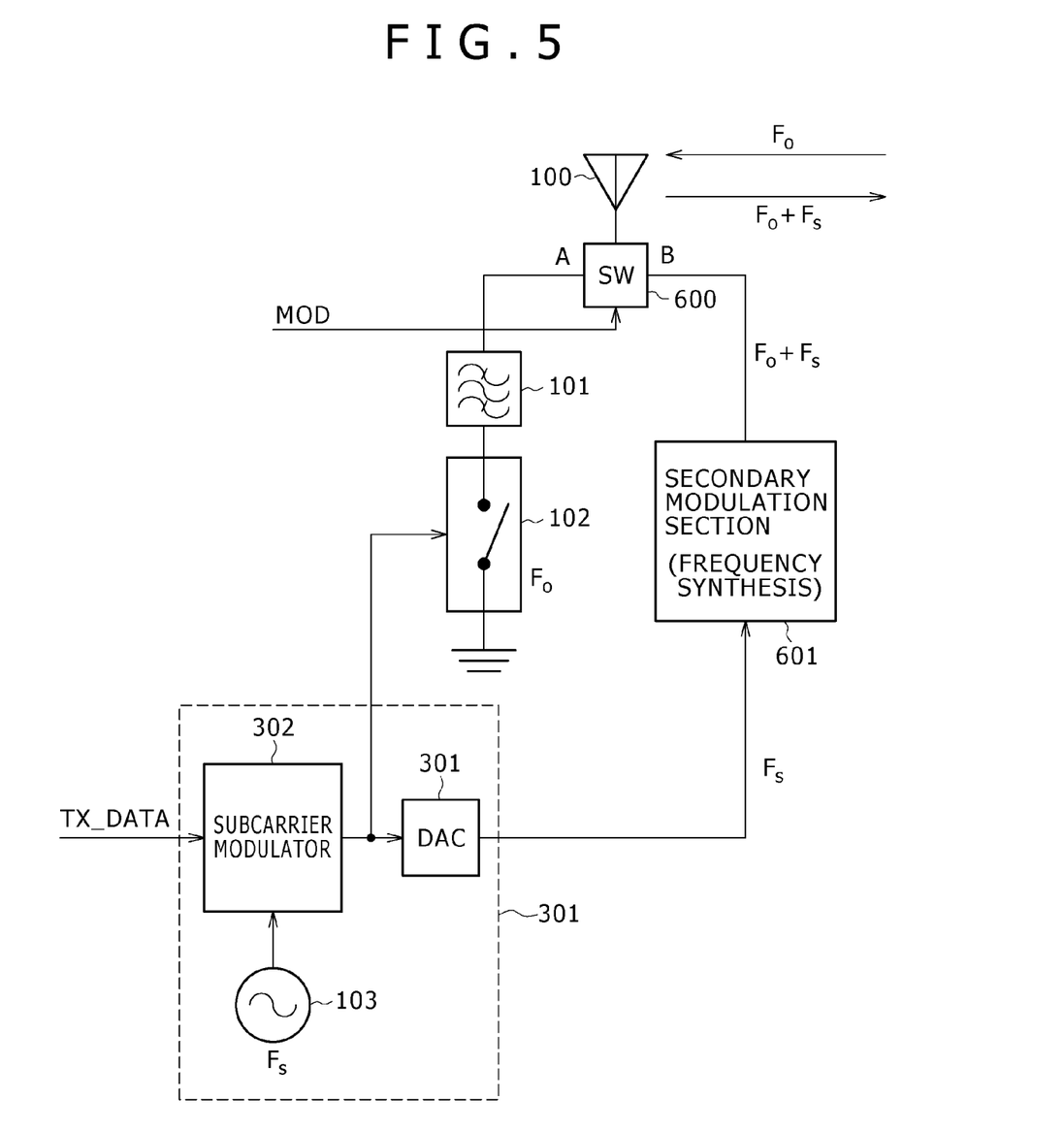
FIG. 5 is a view illustrating a configuration example of a data transmission device configured so that the reflected wave modulation scheme can be switched between the backscatter and frequency mixing schemes.

FIG. 5 illustrates the configuration of the data transmission device 10 used in this case.

In FIG. 5, the data transmission device 10 includes, as the primary modulation section 301, the subcarrier modulator 302, subcarrier oscillator 103 adapted to generate a subcarrier with the center frequency Fs, and D/A converter 303.

The subcarrier modulator 302 performs a primary modulation adapted to modulate sending data (TX_DATA) on the subcarrier frequency Fs, thus generating a modulated subcarrier wave having a digital value (e.g., 10-bit value) which is limited in bandwidth by a digital filter (not shown). In addition to modulation schemes such as PSK, QPSK and 8PSK, which demand only binary amplitude information, fast modulation schemes such as 16QAM, 64QAM and OFDM carrying binary or multi-level amplitude information can also be used. The D/A converter 303 converts the digital modulated signal into analog form.

The data transmission device illustrated in FIG. 6 further includes two secondary modulation sections, one based on the backscatter scheme and another based on the frequency mixing scheme. One of these two modulation sections is alternatively connected to the antenna 100.

The former secondary modulation section based on the backscatter scheme includes the band-pass filter (BPF) 101 and antenna load selector switch 102.

One end of the antenna load selector switch 102 is grounded. The same switch 102 serves as a load of the antenna 100 and is short-circuited when turned on and open-circuited when turned off, thus allowing an unmodulated reflected wave received by the antenna 100 to be modulated by PSK. The subcarrier modulator 104 controls the on/off state of the antenna load selector switch 102 using a digital modulated signal generated from sending data (TX_DATA).

On the other hand, the band-pass filter 101 is used to extract only one of the two modulated waves (Fo+Fs in the example shown). Thus, the same filter 101 passes the received radio wave at the center frequency Fo and the modulated reflected wave at the center frequency Fo+Fs.

Thus, the secondary modulation section based on the backscatter scheme can generate two modulated waves for the unmodulated carrier at the center frequency Fo received by the antenna 100. The two modulated waves respectively have the center frequencies Fo+Fs and Fo−Fs which are upwardly and downwardly apart by the subcarrier frequency Fs from the unmodulated carrier at the center frequency Fo.

On the other hand, a secondary modulation section 601 based on the latter frequency mixing scheme mixes the frequencies of two signals. One of the two signals is an analog modulated signal generated by converting the output of the subcarrier modulator 104 into analog form with the D/A converter 303. The other signal is an unmodulated wave received by the antenna 100. The secondary modulation section 601 performs the above frequency mixing to modulate the unmodulated reflected wave. The same section 601 is configured in the same manner as a functional block denoted by reference numeral 300 in FIG. 1 or that denoted by reference numeral 400 in FIG. 3. Therefore, a description thereof will be omitted.

An antenna switch 600 is adaptively switched to either of the two secondary modulation sections according to the modulation scheme (MOD) used by the subcarrier modulator 302.

More specifically, when a slow modulation scheme such as ASK, PSK, QPSK or 8PSK is used which demands only binary amplitude information, the antenna switch 600 is switched to an "A" position. Modulation of the reflected wave using the backscatter scheme ensures reduced average power consumption.

On the other hand, when a fast modulation scheme such as 16QAM, 64QAM or OFDM is used which carries binary or multi-level amplitude information, the antenna switch 600 is switched to a "B" position. As a result, the above high speed primary modulation can be made possible by modulating the reflected wave by the frequency mixing scheme.

It should be noted that the frequency spectra of the reflected wave transmission system are as illustrated in FIG. 7 and FIG. 2 or 4, respectively when the antenna switch 600 is set to the "A" and "B" positions. Therefore, a description thereof is omitted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A data transmission device for sending back data on a reflected wave of an unmodulated carrier, the data transmission device comprising:

an antenna adapted to receive an unmodulated carrier Fo from a data reader with which data is to be exchanged and send a reflected wave of the unmodulated carrier Fo to the data reader;

subcarrier oscillation means for generating a subcarrier frequency Fs;

subcarrier modulation means for digitally modulating sending data on the subcarrier Fs;

Digital/Analog conversion means for generating an analog modulated subcarrier wave Fs by converting a digital modulated signal, generated by the subcarrier modulation means, into analog form; and frequency mixing means for mixing the unmodulated carrier Fo and the analog modulated subcarrier wave Fs to generate new modulated waves Fo+Fs and Fo−Fs.

2. The data transmission device of claim 1, wherein the subcarrier modulation means use either a modulation scheme of Phase Shift Keying, Quadrature Phase Shift Keying or 8 Phase Shift Keying which demands only binary amplitude information, or a modulation scheme of 16 Quadrature Amplitude Modulation, 64 Quadrature Amplitude Modulation or Orthogonal Frequency Division Multiplexing which carries binary or multi-level amplitude information.

3. The data transmission device of claim 1, wherein the subcarrier modulation means comprise a digital filter adapted to limit the bandwidth of modulated waves.

4. The data transmission device of claim 1, the frequency mixing means are an analog mixer which includes a diode set to operate in the non-saturated region, the analog mixer having two ports adapted to receive an analog modulated signal from the Digital/Analog conversion means and an antenna-received signal received via the band-pass filter, wherein
the band-pass filter is provided between the antenna and frequency mixing means to pass Fo and one of Fo+Fs and Fo−Fs.

5. The data transmission device of claim 1, the frequency mixing means comprising:
a splitter adapted to divide the antenna-received signal;
an Field Effect Transistor mixer adapted to mix the analog modulated wave Fs and antenna-received signal Fo divided by the splitter to generate modulated reflected waves, namely, new modulated waves Fo+Fs and Fo−Fs; and
a band-pass filter having the property to pass only one of the modulated reflected waves Fo+Fs and Fo−Fs, wherein
the splitter transmits one of the modulated reflected waves Fo+Fs and Fo−Fs from the antenna.

6. The data transmission device of claim 5, wherein the splitter comprises a 3-decibel coupler or Wilkinson divider.

7. The data transmission device of claim 1 further comprising:
backscatter modulation means which rely on the change of an antenna load impedance caused by an on/off operation of the antenna load selector switch to modulate the reflected wave of the antenna-received radio wave, the on/off operation of the switch being made according to a digital modulated signal generated by the subcarrier modulation means; and
an antenna switch adapted to connect the frequency mixing means or backscatter modulation means to the antenna according to the modulation scheme used by the subcarrier modulation means,
the backscatter modulation means including
an antenna load selector switch adapted to change the load impedance of the antenna; and a band-pass filter disposed between the antenna and antenna load selector switch, the band-pass filter having the property to pass the frequency Fo and one of the modulated reflected waves at the frequencies Fo+Fs and Fo−Fs.

8. The data transmission device of claim 7, the subcarrier modulation means use, according to the communication quality, either a modulation scheme of Phase Shift Keying, Quadrature Phase Shift Keying or 8 Phase Shift Keying which demands only binary amplitude information, or a modulation scheme of 16 Quadrature Amplitude Modulation, 64 Quadrature Amplitude Modulation or Orthogonal Frequency Division Multiplexing which carries binary or multi-level amplitude information, wherein the antenna switch connects the backscatter modulation means to the antenna when a modulation scheme, which demands only binary amplitude information, is used by the subcarrier modulation means, and connects the frequency mixing means to the antenna when a modulation scheme carrying binary or multi-level amplitude information is used by the subcarrier modulation means.

9. A data transmission device for sending back data on a reflected wave of an unmodulated carrier, the data transmission device comprising:

an antenna adapted to receive an unmodulated carrier Fo from a data reader with which data is to be exchanged and send a reflected wave of the unmodulated carrier Fo to the data reader;

a subcarrier oscillation unit adapted to generate a subcarrier frequency Fs;

a subcarrier modulation unit adapted to digitally modulate sending data on the subcarrier Fs;

a Digital/Analog conversion unit adapted to generate an analog modulated subcarrier wave Fs by converting a digital modulated signal, generated by the subcarrier modulation means, into analog form; and a frequency mixing unit adapted to mix the unmodulated carrier Fo and the analog modulated subcarrier wave Fs to generate new modulated waves Fo+Fs and Fo−Fs.

* * * * *